United States Patent Office 3,567,710
Patented Mar. 2, 1971

3,567,710
PROCESS FOR THE PREPARATION OF 1,3-DIHYDRO-2H-1,4-BENZODIAZEPIN-2-ONES
Rodney Fryer, North Caldwell, and Leo H. Sternbach, Upper Montclair, N.J., assignors to Hoffmann-La Roche Inc., Nutley, N.J.
No Drawing. Filed June 3, 1968, Ser. No. 733,818
Int. Cl. C07d 53/06
U.S. Cl. 260—239.3
12 Claims

ABSTRACT OF THE DISCLOSURE 1,3-dihydro-2H-1,4-benzodiazepin-2-ones are prepared from corresponding substituted 2-aminobenzophenones by a multi-step process. The product compounds are known to be useful as tranquilizers, muscle relaxants, anti-convulsants and hypnotics.

DESCRIPTION OF THE INVENTION

The present invention relates to a process for the preparation of compounds of the following formula

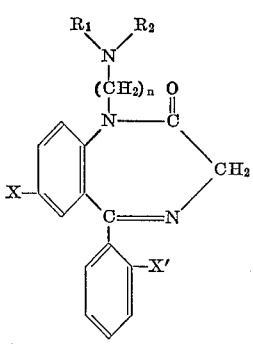

(I)

where $R_1$ and $R_2$ are lower alkyl, X and X' each hydrogen, halogen and trifluoromethyl and $n$ is an integer from 2 to 5.

Compounds corresponding to Formula I above exhibit interesting pharmacological activity. Such compounds have been found useful in the art as tranquilizers, muscle relaxants, anti-convulsants and hypnotic agents. It is evident therefore that a convenient preparative procedure for the manufacture of such compounds is of some importance to pharmaceutical science.

The process of the present invention utilizes 2-aminobenzophenones as starting material. Such compounds are readily available and thus form a convenient class of compounds to be utilized as starting material. The 2-aminobenzophenones useful in the practice of the present invention correspond to compounds having the following formula

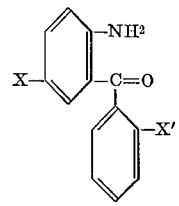

(II)

where X and X' are as above.

In the first step of the present process, compounds of Formula II above are treated with a halo alkanoyl halide, represented by $YCO(CH_2)_{n-1}Y$, where Y is halogen, e.g., bromo acetyl bromide to produce a compound having the following formula

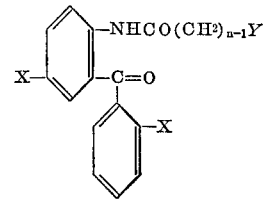

(III)

where Y is halogen and X, X' and $n$ are as above.

The next step in the present process involves reaction of the side-chain halide of the compound of Formula III above with a di-lower alkylamine represented by $HNR_1R_2$ where $R_1$ and $R_2$ are lower alkyl. Suitable di-lower alkylamines for this purpose include diethylamine, dimethylamine, etc. It is generally desirable to utilize di-lower alkylamines having two identical alkyl substituents, although non-symmetrical di-lower alkylamines may also be employed. The compound formed from the above reaction corresponds to the following formula

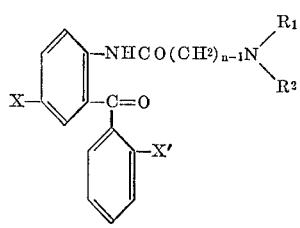

(IV)

where $R_1$, $R_2$, X, X' and $n$ are as above.

Reduction of both oxygen functions in compounds of Formula IV above is effected by treating such compounds with a chemical reducing agent. A suitable chemical reducing agent for this purpose comprises lithium aluminum hydride. The reduced compounds obtained from the above reaction correspond to the following formula:

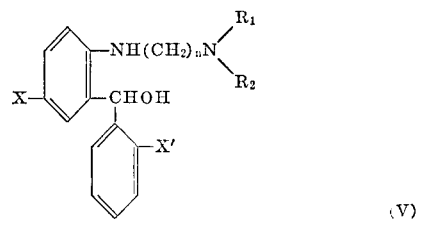

(V)

where $R_1$, $R_2$, X, X' and $n$ are as above.

The benzhydrol obtained above is then reacted with phthalimidoacetyl chloride to form a compound of the following formula:

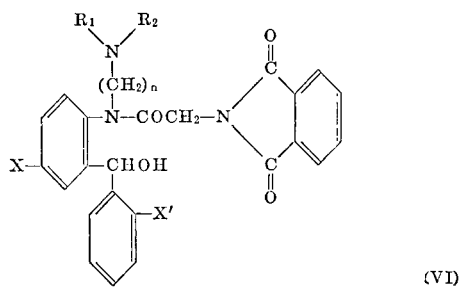

(VI)

where $R_1$, $R_2$, X, X' and $n$ are as above.

The phthaloyl group is removed by treatment with hydrazine yielding a compound of the following formula:

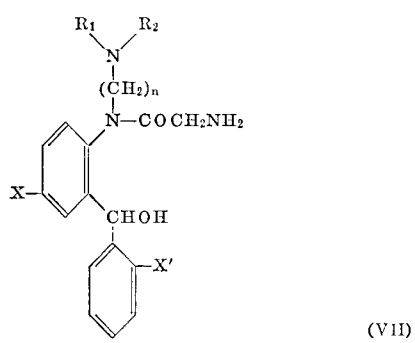

(VII)

wherein $R_1$, $R_2$, X, X' and $n$ are as above.

The benzodiazepine structure is formed upon cyclization of the Formula VII compound above by action of a hydrohalic acid thereon. One possible mechanism for this reaction involves the initial conversion of the benzydrol to the benzhydryl halide which compound undergoes an intramolecular dehydrohalogenation at the reaction conditions employed to yield the desired 4,5-unsaturated benzodiazepine cyclic system. Suitable reagents for the conversion plus cyclization procedure include saturated solutions of hydrohalic acids, preferably hydrogen bromide or hydrogen chloride, in glacial acetic acid. Particularly preferred for this purpose is a saturated solution of hydrogen bromide in glacial acetic acid. The compound so formed corresponds to the following formula:

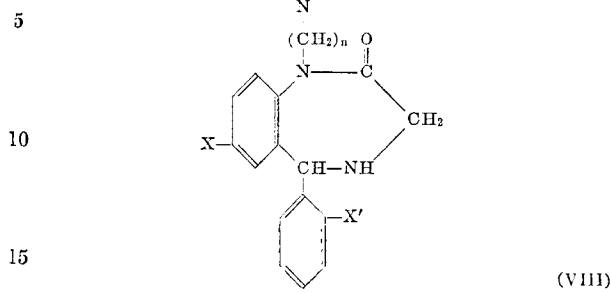

(VIII)

where $R_1$, $R_2$, X, X' and $n$ are as above.

The conversion of compounds of Formula VIII above to the desired compounds of Formula I above may be accomplished by alternate pathways. In one pathway compounds of Formula VIII above are treated with an oxidizing agent to effect unsaturation at the 4,5-position in the benzodiazepine ring. Suitable oxidizing agents for this purpose include quinones, such as 2,3-dichloro-5,6-dicyanoquinone.

An alternative pathway involves a two-step procedure wherein the compound of Formula VIII above is intially treated with a reagent having a leaving group which leaving group substitutes for the proton on the nitrogen atom at the 4-position of the benzodizaepine ring. Reagens suitable for this purpose include p-toluenesulfonyl halide, e.g., p-toluenesulfonyl chloride, mesyl chloride, p-bromobenzylsulfonyl chloride. The resulting compounds maybe represented by the following formula

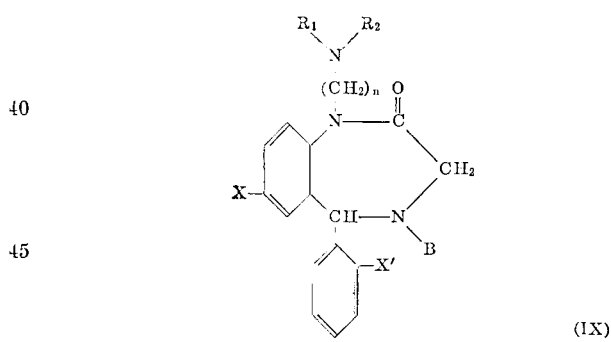

(IX)

where B is a leaving group such as tosyl, mesyl, p-bromobenzylsulfonyl and $R_1$, $R_2$, X, X' and $n$ are as above.

The leaving group B is readily displaced by treatment with base such as, for example, sodium methoxide, sodium hydride, sodium tri-tertiary butoxide, etc. Concomitant with the displacement of the leaving group B, is the formation of the double bond at the 4,5-position of the benzodiazopine ring to yield the desired compound of the Formula I above.

In one preferred embodiment of the present invention, compounds of Formula I wherein X and X' are halogen are prepared. A most preferred aspect of this invention relates to the preparation of compounds wherein X is chlorine and X' is fluorine. Further to this preferred embodiment, the lower alkyl of $R_1$ and $R_2$ is ethyl and the value of $n$ is 2. Thus, the compound produced in a most preferred embodiment of this invention is 7-chloro-1-(2-diethylaminoethyl)-5-(2-fluorophenyl)-1,3-dihydro - 2H - 1,4-benzodiazepin-2-one.

The process steps of the present invention may be more clearly understood by reference to the following scheme wherein each of the respective reaction steps are summarized. Each step in sequence has been identified by a capital letter which is located under the respective reaction arrow. In the following scheme, the meanings for $R_1$, $R_2$, X, X', B, Y and $n$ are as above throughout.

SCHEME I

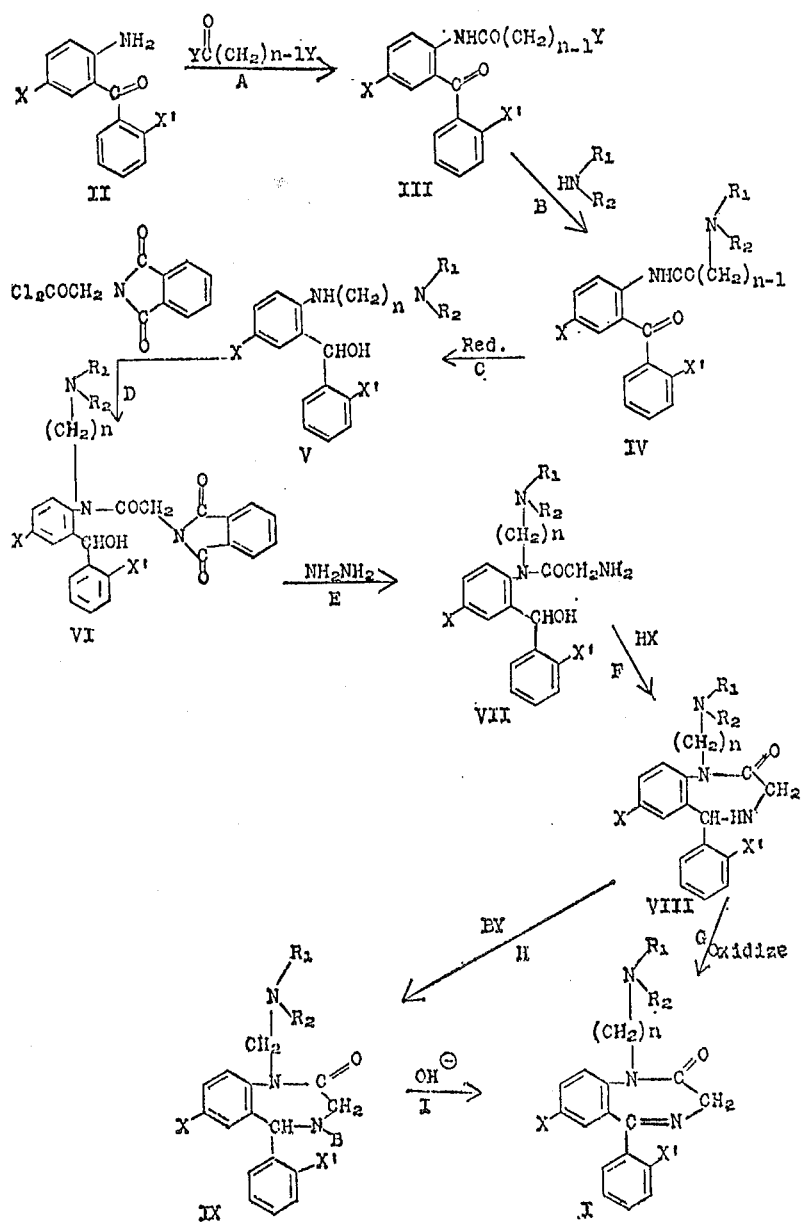

The reaction conditions and selection of solvents for each of the respective reactions identified in the above reaction scheme by a capital letter under the corresponding arrow are summarized below in Table I. Reaction conditions include both operative values and preferred ranges. Similar designations for operative and preferred are given for the solvents useful in each of the enumerated reactions. All temperatures are in degrees centigrade.

EXAMPLE 1

Preparation of 4'-chloro-2-diethylamino-2'-
(2'-fluorobenzoyl)-acetanilide

A solution of 75 g. (0.202 m.) of 2-bromo-4'-chloro-2'-(2-fluorobenzoyl) acetanilide in 325 ml. of dichloromethane was treated with 17.7 g. (0.242 m.) of diethylamine. After standing overnight at room temperature

TABLE I

| Reaction | Reaction conditions | | Solvents | |
|---|---|---|---|---|
| | Operative | Preferred | Operative | Preferred |
| A | Below room temp. to reflux temp. of solvent. | 50–80° | Any inert organic solvent | Benzene. |
| B | Below room temp. at atmospheric pressure to 160° in an autoclave. | 20–30° | do | Dichloromethane. |
| C | Room temp. to reflux temp. of solvent | 35–80° | Any ether such as ethyl ether, butyl ether, tetrahydrofuran. | Tetrahydrofuran. |
| D | Below room temp. to reflux temp. of solvent. | 50–80° | do | Do. |
| E | −10–100° | At or about room temperature (23°). | do | Chloroform, ethanol. |
| F | 10–100° | do | In the first step, the reactant is the solvent (HBr in HOAc). In the second step (cyclization), any inert solvent, preferably EtOAc. | |
| G | Room temp. to reflux temp. of solvent | 60–100° | Any inert organic solvent | Benzene, toluene. |
| H | do | 60–100° | Any tertiary organic base | Pyridine. |
| I | do | At or about room temp. | Any inert organic solvent | Benzene, N,N-dimethylformamide. | another 17 g. of diethylamine was added and the mixture was allowed to stand for an additional 2.5 hours. The solution was washed with 500 ml. of water, 200 ml. of saturated brine solution, stirred with charcoal and anhydrous sodium sulfate, filtered and evaporated to dryness.

The residual oil (64 g.) was dissolved in 150 ml. of benezene and filtered through 400 g. of Florisil. The product was eluted with benzene followed by ether. The ether fraction was concentrated and the product recrystallized from ether, and then from a mixture of ether and petroleum ether to give the above-titled compound as white prisms, M.P. 48–59°. The benzene fraction was evaporated to give additional product as an oil which was not further purified but used directly in the subsequent steps.

EXAMPLE 2

Preparation of 5-chloro-2-(2-diethylaminoethyl-amino)-2'-fluorobenzdhydrol

A solution of 8.7 g. (0.229 m.) of lithium aluminum hydride in 200 ml. of dry tetrahydrofuran under nitrogen was cooled in an ice bath and treated by the dropwise addition of a solution of 55.6 g. (.153 m.) of 4'-chloro-2-diethylamino-2'-(2-fluorobenzoyl) acetanilide in 150 ml. of dry tetrahydrofuran. The reaction was stirred overnight at room temperature and then heated under reflux for 1 hour. An additional 5.8 g. (0.153 m.) of lithium aluminum hydride was added and the reaction mixture was heated under reflux for 1 hour, cooled to room temperature when excess reagent was decomposed with 10 ml. of water. A saturated solution of sodium bicarbonate was added until the emulsion coagulated. The precipitate was removed by filtration over Celite and washed with dichloromethane. The filtrates were combined and evaporated to dryness to give the above-titled compound as an oil. This material was used without further purification in subsequent reactions.

EXAMPLE 3

Preparation of 4'-chloro-N-(2-diethylaminoethyl)-2'-(2-fluoro-α-hydroxylbenzyl)-2-phthalimidoacetanilide A solution of 10 g. (0.285 m.) of 5-chloro-2-(2-diethylamino-ethylamino)-2'-fluorobenzhydrol in 100 ml. of tetrahydrofuran was treated with 7 g. (0.0313 m.) of phthalimidoacetyl chloride and the solution was heated under reflux for 5 hours. Solvent was removed under reduced pressure and the residue was partitioned between 100 ml. of dichloromethane and 100 ml. of 5 percent potassium carbonate solution. The organic layer was separated, washed with saturated brine, dried over anhydrous sodium sulfate and evaporated to dryness. The product was crystallized from a mixture of ether and petroleum ether as white prisms, M.P. 102–25°.

EXAMPLE 4

Preparation of 4'-choloro-N-(2-diethylaminoethyl)-2'-(2-fluoro-α-hydroxybenzyl)-2-aminoacetanilide A solution of 4 g. (0.00743 m.) of 4'-chloro-N-(2-diethylaminoethyl) - 2' - (2-fluoro-α-hydroxybenzyl) - 2-phthalimidoacetanilide, in 45 ml. of chloroform and 45 ml. of ethanol was treated with 1.1 g. (0.0223 m.) of hydrazine hydrate, and the reaction mixture was allowed to stand for 17 hours at room temperature. Solvents were evaporated under reduced pressure, and the residue was made basic with dilute ammonium hydroxide and extracted into 100 ml. of ether. The ether layer was separated, washed with 75 ml. of water followed by 75 ml. of 3 N hydrochloric acid. The acid layer was made basic with ammonium hydroxide and extracted with 100 ml. of dichloromethane. The organic layer was washed with saturated brine, dried over anhydrous sodium sulfate and evaporated to dryness. The residual oil was crystallized from a mixture of ether and petroleum ether to give the above-titled product as white prisms, which upon further recrystallization melted at 93–100°.

EXAMPLE 5

Preparation of 7 - chloro-1-(2-diethylaminoethyl)-5-(2-fluorophenyl) - 1,3,4,5 - tetrahydro - 2H - 1,4 - benzodiazepin-2-one dihydrochoride A soution of 150 mg. (0.000368 m.) of 4'-choro-N-(2-diethylaminoethyl) - 2' - (2-fluoro-α-hydroxybenzyl) - 2-aminoacetanilide in 5 ml. of a saturated solution of hydrogen bromide in glacial acetic acid was allowed to stand 3 hours at room temperature, and was then distilled to dryness under reduced pressure. Ethyl acetate (10 ml.) and triethylamine (3 ml.) were added, and after 2 hours, the triethylamine hydrobromide was filtered off. The filtrate was evaporated to dryness and the residual oil was dissolved in 50 ml. of dichloromethane. The solution was washed with 50 ml. of water, 30 ml. of saturated brine, dried over anhydrous sodium sulfate and evaporated to dryness.

The resulting oil was dissolved in dichloromethane, and was applied to thick layer silica gel plates, which were then eluted with a solvent mixture of 90 percent ethyl acetate and 10 percent methanol (v./v.). The spot corresponding to the base was scraped off the plates and separated from silica gel by stirring with methanol and ethyl acetate. The solution was filtered and evaporated to dryness. The oil, thus obtained, was dissolved in 15 ml. of dichloromethane, which was then washed with 10 ml. of saturated brine containing a drop of ammonium hydroxide, dried over anhydrous sodium sulfate and evaporated to dryness. The salt crystallized from ethanolic hydrogen chloride and ether to give the above-titled compound as white rods, M.P. 215–25°.

EXAMPLE 6

Preparation of 7-chloro-1-(2-diethylaminoethyl)-5-(2-fluorophenyl)-1,3-dihydro-2H-1,4-benzodiazepin-2-one Method 1: A solution of 0.5 g. (0.00128 m.) of 7-chloro - 1 - (2-diethylaminoethyl) - 4,5 - dihydro - 5-(2-fluorophenyl)-3H-1,4-benzodiazepin-2(1H)one, in 50 ml. of dry benzene was treated with 0.7 g. (0.00308 m.) of 2,3-dichloro-5,6-dicyanoquinone and the solution was heated under reflux for 6 hours. The precipitate was removed by filtration and dissolved in 100 ml. of dichloromethane. The solution was washed with dilute ammonium hydroxide (75 ml.) and evaporated to dryness. The residue was dissolved in 100 ml. of ether and extracted into 75 ml. of 1 N hydrochloric acid. The acid layer was made basic with ammonium hydroxide and extracted with 100 ml. of dichloromethane, which was then washed with saturated brine, dried over anhydrous sodium sulfate and evaporated to dryness.

The oil was dissolved in ether, which was treated with charcoal and filtered. The product was crystallized by the addition of petroleum ether to give the above-titled product as white rods, melting at 76–80°.

Method 2: A solution of 3.2 g. (0.168 m.) of p-toluenesulfonyl chloride in 25 ml. of pyridine was added dropwise to a solution of 5.7 g. (0.014 m.) of 7-chloro-1-(2-diethylaminoethyl) - 5 - (2-fluorophenyl) - 1,3,4,5 - tetrahydro-2H-1,4-benzodiazepin-2-one dihydrochloride in 25 ml. of pyridine. The reaction mixture was heated under reflux for 2 hours, cooled and poured into 200 ml. of ice water. The precipitate was obtained by filtration, washed with water and then dissolved in 100 ml. of dichloromethane. The solution was washed with 100 ml. of water, 75 ml. of brine, dried over anhydrous sodium sulfate and evaporated to dryness. The product was recrystallized from methanol to give 7-chloro-1-[2-(diethylamino)ethyl] - 5 - (2-fluorophenyl) - 4 - (p-tolysulfonyl) - 1,3,4,5-tetrahydro-2H-1,4-benzodiazepin-2-one as white prisms, M.P. 179–82°.

A solution of 1 g. (0.00184 m.) of 7-chloro-1-[2-(diethylamino)ethyl] - 5 - (2-fluorophenyl) - 4 - (p-tolysulfonyl) - 1,3,4,5 - tetrahydro - 2H - 1,4 - benzodiazepin-2-one in 25 ml. of N,N-dimethylformamide was treated with 0.43 ml. (0.00202 m.) of a solution of 4.69 N sodium methoxide in methanol. The solution was allowed to stand for 17 hours and was then poured into 100 ml. of water. The product was extracted into 75 ml. of ether, and the ether layer was then extracted with 75 ml. of 1 N hydrochloric acid. The acid layer was made basic with ammonium hydroxide, and extracted with 100 ml. of dichloromethane which was then washed with 75 ml. of brine, dried over anhydrous sodium sulfate and evaporated to dryness. The residual oil was crystallized from ether to remove some of the starting material, and the filtrates were first evaporated to dryness and then dissolved in 10 ml. of benzene and chromatographed on a silica gel (100 g.) column. The benzene and ether fractions were discarded, and the ethyl acetate fraction was crystallized from a mixture of ether and petroleum ether to give the above-titled compound as white prisms melting at 75–100°. The crystals were triturated with ether, filtered, and the filtrates were evaporated to dryness. The resulting oil was crystallized from a mixture of ether and petroleum ether to give the desird product as white rods, M.P. 77–82°.

We claim:

1. Process for the preparation of compounds of the formula

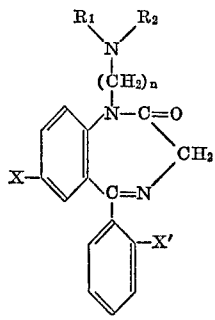

where $R_1$ and $R_2$ are lower alkyl, X and X' are each hydrogen, halogen, trifluoromethyl and $n$ is an integer from 2 to 5, said process comprising the following steps in combination:

(A) reacting a benzophenone of the formula

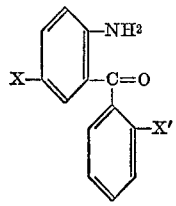

where X and X' are as above, with a halo alkanoyl halide;

(B) treating the product from (A) with a di-lower alkylamine;

(C) reducing the carbonyl functions of the product from (B) with lithium aluminum hydride to yield a benzhydrol;

(D) reacting the aforesaid benzhydrol product with phthalimidoacetyl chloride;

(E) removing the phthaloyl group by treating the product from (D) with hydrazine;

(F) treating the product from (E) with a hydrohalic acid to form a 4,5-saturated benzodiazepine ring; and (G) oxidizing the 4,5 saturated benzodiazepine product from (F) to yield the desired compound of Formula I above.

2. The process of claim 1 wherein said halo alkanoyl halide of step (A) is bromo acetyl bromide.

3. The process of claim 1 wherein said di-lower alkylamine of step (B) is diethylamine.

4. The process of claim 1 wherein said hydrohalic acid of step (F) is used in the form of a saturated solution of said hydrohalic acid in glacial acetic acid.

5. The process of claim 4 wherein said hydrohalic acid is hydrogen bromide.

6. The process of claim 1 wherein said oxidation of the 4,5 saturated benzodiazepine in step (G) results from the treatment of the product from step (F) with 2,3-dichloro-5,6-dicyanoquinone.

7. The process of claim 1 wherein said oxidation of the 4,5 saturated benzodiazepine in step (G) results from the treatment of the product from step (F) with a reagent having an active leaving group selected from the group consisting of tosyl, mesyl and p-bromo-benzylsulfonyl whereby the proton on the 4 nitrogen atom is substituted by said leaving group followed by the treatment of said substituted product with base.

8. The process of claim 7 wherein said leaving group is a tosyl group.

9. The process of claim 1 wherein X and X' are each halogen.

10. The process of claim 11 wherein X is chlorine and X' is fluorine.

11. The process of claim 1 wherein $R_1$ and $R_2$ each are ethyl and $n$ is 2.

12. The process of claim 1 wherein the compound produced is 7 - chloro-1-(2-diethylaminoethyl)-5-(2-fluorophenyl)-1,3-dihydro-2H-1,4-benzodiazepin-2-one.

References Cited
UNITED STATES PATENTS
3,299,053 12/1967 Archer et al. _____ 260—239.3

HENRY R. JILES, Primary Examiner
R. T. BOND, Assistant Examiner

U.S. Cl. X.R.
260—326, 999